(12) United States Patent
Harger

(10) Patent No.: US 6,382,496 B1
(45) Date of Patent: May 7, 2002

(54) WELDING HANDLE CLAMP

(75) Inventor: Timothy R. Harger, Libertyville, IL (US)

(73) Assignee: Harger, Inc., Grayslake, IL (US)

( * ) Notice: Subject to any disclaimer, the term of this patent is extended or adjusted under 35 U.S.C. 154(b) by 0 days.

(21) Appl. No.: 09/627,104

(22) Filed: Jul. 27, 2000

(51) Int. Cl.$^7$ .................. B23K 37/053; B23K 37/06
(52) U.S. Cl. .................. 228/44.3; 228/44.5; 228/234.3
(58) Field of Search .................. 228/212, 213, 228/234.3, 44.3, 44.5; 164/322, 339, 341

(56) References Cited

U.S. PATENT DOCUMENTS

| | | | |
|---|---|---|---|
| 3,578,233 A | * | 5/1971 | Meister et al. |
| 5,533,662 A | * | 7/1996 | Stidham et al. |
| 5,538,174 A | * | 7/1996 | Gaman |
| 5,653,279 A | * | 8/1997 | Foutz et al. |
| 5,660,317 A | * | 8/1997 | Singer et al. |
| 5,829,510 A | * | 11/1998 | Fuchs |
| 5,954,261 A | * | 9/1999 | Gaman |

FOREIGN PATENT DOCUMENTS

| | | | |
|---|---|---|---|
| DE | 3206533 C1 | * | 8/1983 |
| EP | 0870568 A1 | * | 10/1998 |
| EP | 0870569 A1 | * | 10/1998 |

OTHER PUBLICATIONS

"Croweld Electrical Connections", Materials, Tools and Accessories, Section A, pp. A–8 dated Aug. 1, 1995 and A–9 dated Jun. 1, 1997, Erico, Inc., Solon, Ohio.
"Special Thermochange Clamps", p. 76, undated.

* cited by examiner

*Primary Examiner*—Tom Dunn
*Assistant Examiner*—Kiley Stoner
(74) *Attorney, Agent, or Firm*—Cook, Alex, McFarron, Manzo, Cummings & Mehler, Ltd.

(57) ABSTRACT

Handle clamps and a clamping kit for clamping or clamping and fastening a mold during exothermic welding are disclosed in which a single handle clamp may be utilized in at least three different exothermic welding operations. The handle clamp may be utilized with or without removable support arms to simply clamp the mold parts together where only the ends of cables are to be connected together within a cavity of the mold. If it is desired to connect the cables to either a flat surface or a curved surface, the support arms are attached to the handle clamp, and either a magnetic fastening assembly or a chain assembly is attached to the support arms to fasten the handle clamp and mold to the respective differently shaped surfaces.

16 Claims, 6 Drawing Sheets

WELDING HANDLE CLAMP

BACKGROUND AND SUMMARY OF THE INVENTION

The present invention relates to handle clamps for clamping molds together in exothermic welding procedures, for mounting the molds to structures to which the welds are to be adhered, and to a kit therefor.

Exothermic weld connections have been successfully used to connect a wide range of materials together. For example, cables may be connected to each other by employing exothermic weld connections. In these connections the cables are placed in a cavity in a mold which is capable of withstanding high temperatures, for example a graphite mold. The mold is closed, its mold halves are clamped together, and a powdered weld metal of a mixture of fine copper oxide and aluminum particles is placed into the cavity in the mold surrounding the ends of the cables to be connected. The weld metal in the mold is then fired with a flint to initiate an exothermic thermite reaction of the weld metal. Upon cooling and solidification, the weld metal encapsulates the ends of the cables to be connected. Once the cables have been connected and encapsulated by the solidified weld metal, the clamp is released, the mold is opened and the welded together cables are removed from the mold.

Exothermic welding has also been employed to weld cables to rounded steel surfaces such as pipes and/or to flat steel surfaces such as plates. In these instances, the cable to be welded to these surfaces is placed in a cavity of the mold, the mold is closed, and the mold is fastened and mounted to the rounded or flat surface with the mold cavity exposed and opening to the surface to which the cable is to be welded. The mold cavity is then filled with the weld metal, and the weld metal is fired to exothermically weld the cable to the rounded or flat surface.

In the past, three different specific custom configurations of handle clamps were needed each of which was specifically designed for each of these welding procedures. One simple handle clamp was needed to simply clamp the mold parts together where the ends of two or more cables were to be connected in the mold in the first of the procedures described above. A second handle clamp was needed which included a pair of support arms integrally formed with the clamp and which were specially configured to carry a pair of magnetic supports so that in addition to clamping the mold parts together as previously described, handle clamps with their magnetic supports could also magnetically fasten and support the mold against a flat steel plate to which the cable was to be welded. Still a third handle clamp was needed where the cable was to be welded to a curved or rounded surface, such as a steel pipe. In this case, the handle clamp included a pair of support arms which were integrally formed with the clamp and which were specially configured to carry a chain which could be wrapped around the round pipe. These chain handle clamps again functioned to clamp the mold parts together and with the chain, could fasten and support the mold and its cavity to the rounded surface of the pipe to which the cable was to be welded.

It is a principal purpose of the present invention to provide a single handle clamp which is capable of functioning equally well in each of the previously discussed three exothermic welding procedures and without the need for three different custom designed clamps. Specifically, the welding handle clamp of the present invention not only functions to clamp the mold parts together in an exothermic welding mold either when multiple cables are to be connected within the mold, but also mounts the mold when one or more cables are to be welded to either a flat or rounded surface.

In one principal aspect of the present invention, a handle clamp for exothermic welding molds comprises a pair of supports spaced from each other, but moveable toward and away from each other, and each of the supports has clamping elements for mounting the supports to an exothermic welding mold and clamping the mold together. The clamp also includes a pair of links with each of the supports mounted adjacent one end of each of the pair of links, and a pair of handles each of which is mounted adjacent the other opposite end of the pair of links. A pin assembly couples the links and handles so that the links, supports and clamping elements move relative to each other when the handles are moved relative to each other. The clamp also includes a pair of support arms which extend respectively from each of the links generally in the direction of movement of the links relative to each other, and each of the support arms has a first end which is removably attached to is respective link.

In another principal aspect of the present invention, each of the links comprises a pair of flanges spaced from each other, and the first end of the support arms extends between the spaced flanges of each of the links.

In still another principal aspect of the present invention, the first end of each of the support arms is stepped and the step is positioned between the flanges.

In still another principal aspect of the present invention, the handle clamp includes a removable pin extending between the flanges and through the first end of each support arm to removably fasten the support arm to the flanges.

In still another principal aspect of the invention, each of the support arms is constructed and arranged to mount a fastening adjacent an end thereof opposite the first end for fastening the mold to a structure when the support arms are attached to the links and the clamping element clamps the mold together.

In still another principal aspect of the invention, the fastening may include either a magnetic element or a chain.

In still another principal aspect of the invention, each of the support arms includes a hole and/or a notch to mount fastenings adjacent an end thereof opposite the first end for fastening the mold to a structure when the support arms are attached to the links and the clamping elements clamp the mold together.

In still another principal aspect of the invention, the clamping elements comprise at least one pin on each of the supports which is adapted to extend into the mold to be clamped.

In still another principal aspect of the invention, a handle clamp for exothermic welding molds comprises a pair of supports spaced from each other, but moveable toward and away from each other, and each of the supports has clamping elements for mounting the supports to an exothermic welding mold and clamping the mold together. The clamp also includes a pair of links with each of the supports mounted adjacent one end of each of the pair of links, and a pair of handles each of which is mounted adjacent the other opposite end of the pair of links. A pin assembly couples the links and handles so that the links, supports and clamping elements move relative to each other when the handles are moved relative to each other. The clamp also includes a pair of support arms which are attached to and extend respectively from each of the links generally in the direction of movement of the links relative to each other, and each of the support arms is constructed and arranged to mount in the alternative either a magnetic or a chain fastening for fastening the mold to a structure.

In still another principal aspect of the invention, a clamp kit for clamping or clamping and fastening a welding mold during exothermic welding, includes a handle clamp comprising a pair of links, and a pin extending from one end of each of the links. The pins are adapted to enter openings in the mold to clamp the mold together. A handle is positioned adjacent the end of the links opposite the pins, and a pin assembly couples the links and handles so that the links and pins move relative to each other when the handles are moved relative to each other. A pair of support arms is included in the kit each of which has a first end which may be removably attached to one of the links so that one of the support arms extends from each of the links generally in the direction of movement of the links relative to each other. At least one fastener is also in the kit for mounting to the support arms adjacent the end of the support arms opposite the first end, and the fastener comprises at least one of a magnetic element and/or a chain.

In still another principal aspect of the invention, the kit includes a pin for removably attaching the support arms to the links.

In still another principal aspect of the invention, the kit includes only one pair of the support arms, a fastener having a magnetic element, and a fastener having a chain.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENT

Figure 1:
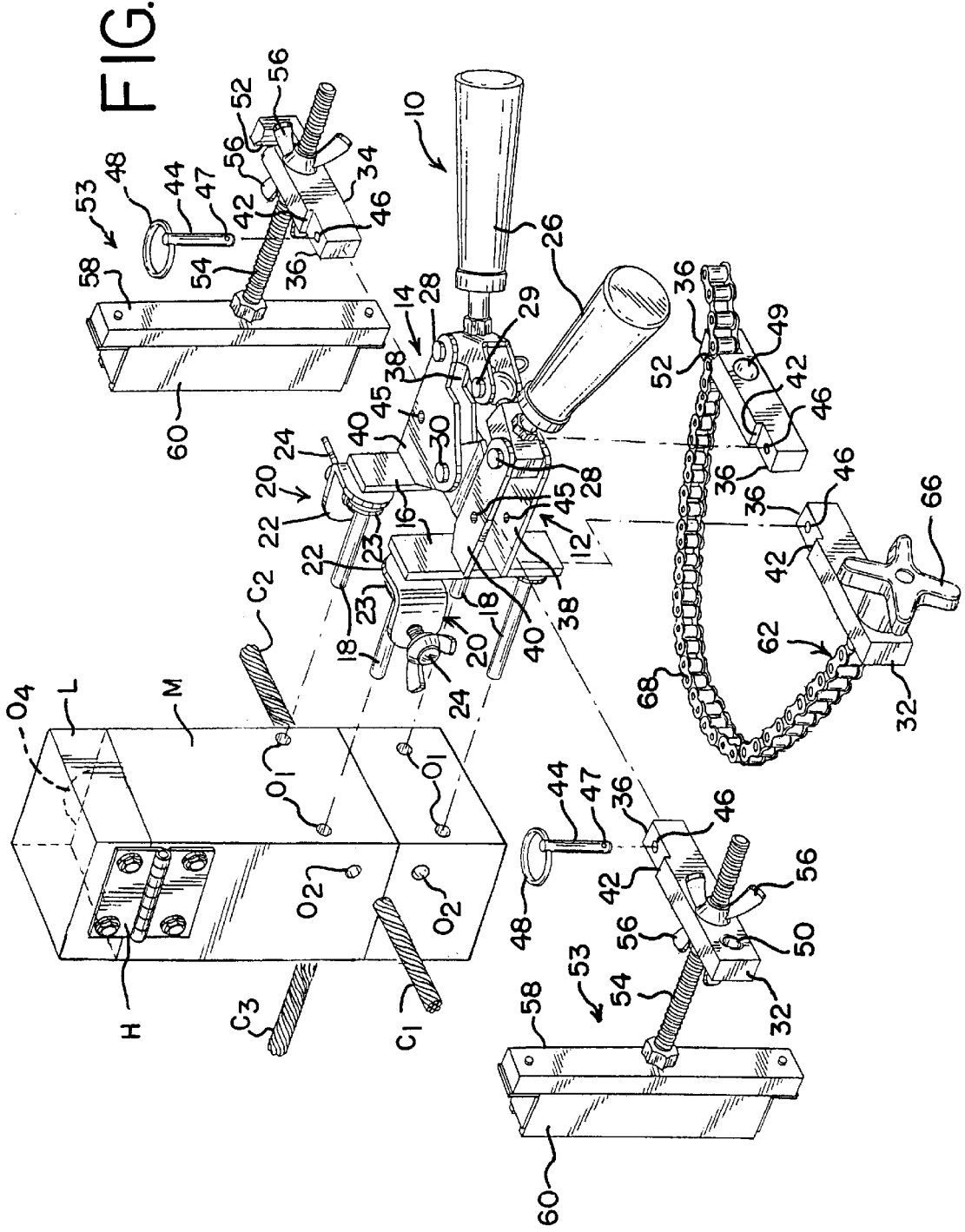
FIG. 1 is an overall perspective, exploded view of a preferred embodiment of a handle clamp of the present invention, together with an exothermic welding mold and magnetic and chain fasteners which form a kit.

With particular reference to FIG. 1, a preferred embodiment of kit including a welding handle clamp 10 is shown.

The handle clamp 10 generally comprises a pair of links 12 and 14. A pair of support plates 16 are fixed to the ends of the links 12 and 14, and the plates 16 extend generally perpendicular the links. Each of the support plates 16 includes one or more clamping elements in the form of pins 18 which extend forward of the support plates 16. As will be seen in the drawings, the pins 18 are adapted to enter openings $O_1$ in the respective halves of the welding mold M.

Additional fasteners 20 are also preferably provided on some of the pins 18. The fasteners 20 preferably comprise an L-shaped bracket 22, one leg of which is loosely mounted on one of the pins 18 to permit the L-shaped bracket to rotate about the pin. A collar 23 is also preferably stationarily fixed on the pins 18 on the side of the L-shaped brackets 22 opposite the support plate 16 to prevent the fasteners 20 from sliding off the ends of the pins 18 and being lost, but still permit the bracket 22 to rotate about its pin 18. The other leg of the L-shaped bracket 22 includes a bolt 24 with a winged head to permit the bolt to be readily manually adjusted. As will be seen from the drawings, the bolt 24 may be rotated to extend into an opening $O_2$ on the sides of the mold to insure that the mold is securely clamped together when the weld metal is to be fired, but permit the mold parts to be easily separated once the weld has been completed.

The handle clamp 10 also includes a pair of handles 26. The handles 26 are mounted to the other ends of the links 12 and 14 by pins 28 to permit the handles to rotate relative to the links. In turn, the handles 26 are coupled to each other by a pin 29, and the support links 12 and 14 are coupled to each other by a pin 30. This multiple pin assembly arrangement permits the pins 18, support plates 16 and links 12 and 14 to all move relative to each other in a scissors— like fashion when the handles 26 are manipulated to permit accurate positioning of the pins 18 for entry into the openings $O_1$ in the mold M.

Figure 3:
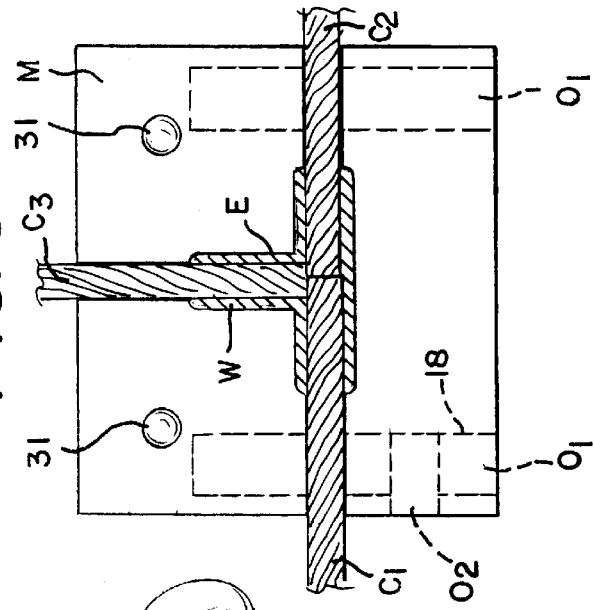
FIG. 3 is a cross-sectioned plan view, as viewed substantially along line 3—3 of FIG. 2, showing the cavity within the mold for connecting the cables together and containing the weld metal.
Figure 2:
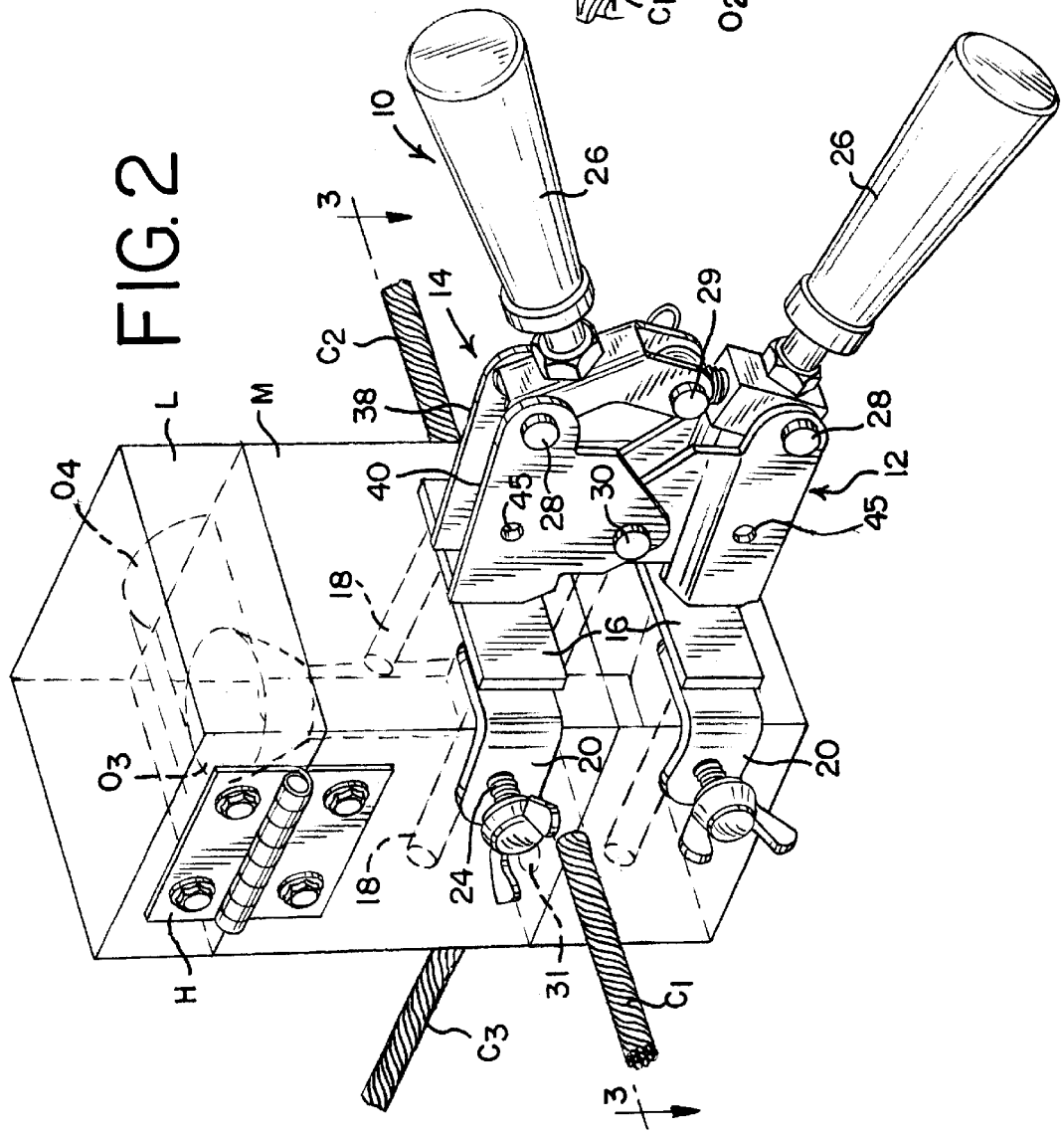
FIG. 2 is a perspective view of the handle clamp and exothermic welding mold of FIG. 1 in which the clamp clamps the mold with the ends of one or more cables which are to be connected together within the mold by the weld.

The handle clamp 10 thus far described and without further additional components, is capable of clamping a mold for connecting elements together within the mold. For example, as shown in FIGS. 2 and 3, and particularly with reference to FIG. 3, the interior of the mold M contains a cavity into which at least two cables $C_1$ and $C_2$ and/or a third intersecting cable $C_3$ may be placed so that their ends extend into close proximity to each other and into an enlarged portion E of the cavity. With the cables $C_1$, $C_2$ and $C_3$ positioned in the cavity, the two mold halves are placed together and are aligned with each other by short alignment pins 31 which mate with corresponding recesses in the respective mold halves. Once the mold halves are placed together, they are clamped in place by the operation of the handle clamp 10 to position the clamping pins 18 relative to each other to fit into the openings $O_1$ in the mold M. Once the pins 18 are fully positioned in the molds, the fasteners 20 are manipulated so that their bolts 24 may be positioned in the openings $O_2$ in the sides of the mold thereby securely clamping the mold halves together for the exothermic welding procedure.

At this point, weld metal, which is typically a granular particulate mixture of copper oxide and aluminum, is introduced through the opening $O_3$ in the top of the mold as seen in FIG. 2 to fill the enlarged portion E of the cavity and surrounding the ends of the cables $C_1$, $C_2$ and $C_3$. The mold lid L, which is preferably formed of the same heat resistant material as the mold and which is attached by a hinge H to the mold M, is then closed and the weld metal is ignited by a flint (not shown) through the opening $O_4$ between the lid and the top of the mold and the opening $O_3$ to the cavity. This causes a thermite reaction in which the copper oxide and aluminum melt and then fuse in the enlarged portion E of the cavity around the cables $C_1$, $C_2$ and $C_3$ to form a weld W to connect the cables together. After welding has occurred, the bolts 24 are backed out of the openings $O_2$, and the pins 18 of the handle clamp 10 are removed from the openings $O_1$, to permit separation of the halves of the mold M to remove the now welded together cables $C_1$, $C_2$ and $C_3$ from the mold.

In the past, mold configurations have also been provided for the connection of cables and the like to flat plates or to pipes having curved or rounded surfaces. In these cases, a magnetic fastener assembly was employed to hold the handle clamps and molds to the flat surfaces or a chain arrangement was employed to hold the handle clamps and molds to the curved pipe surfaces for exothermic welding. However, separate specially designed, custom built handle clamps were needed to perform these specific respective fastening and mounting functions. Thus, if an exothermic welding kit was to be capable of performing each of these three specific welding operations at least three specially custom configured handle clamps were needed. In the present invention, a single handle clamp assembly is capable of performing all three functions, i.e. of performing exothermic connections entirely within the mold, against a flat surface and/or against a curved pipe As shown in FIGS. 1 and 4–7, a pair of mold support arms 32 and 34 are also provided as part of the kit. Each of the support arms 32 and 34 includes an inner end which is slightly stepped at 36, as best seen in FIG. 1, so that it fits in a space between a pair of flanges 38 and 40 which are spaced from each other and which form the links 12 and 14 of the handle clamp 10. The step 36 permits the end of the mold support arms 32 and 34 to be inserted into the space between the flanges 38 and 40, and the rise 42 in the step bears against the edge of the upper flange 40 to prevent the mold support arms from rotating. The mold support arms 32 and 34 are removably held in place by a pin 44 which extends through openings 45 in the flanges and openings 46 in the step 36 of the support arms. Each of the pins 44 also preferably includes a spring loaded detent 47 adjacent its tip to prevent accidental removal of the pins 44, and a ring 48 adjacent its other end to facilitate removal of the pins 44 when desired. surface.

Figure 5:
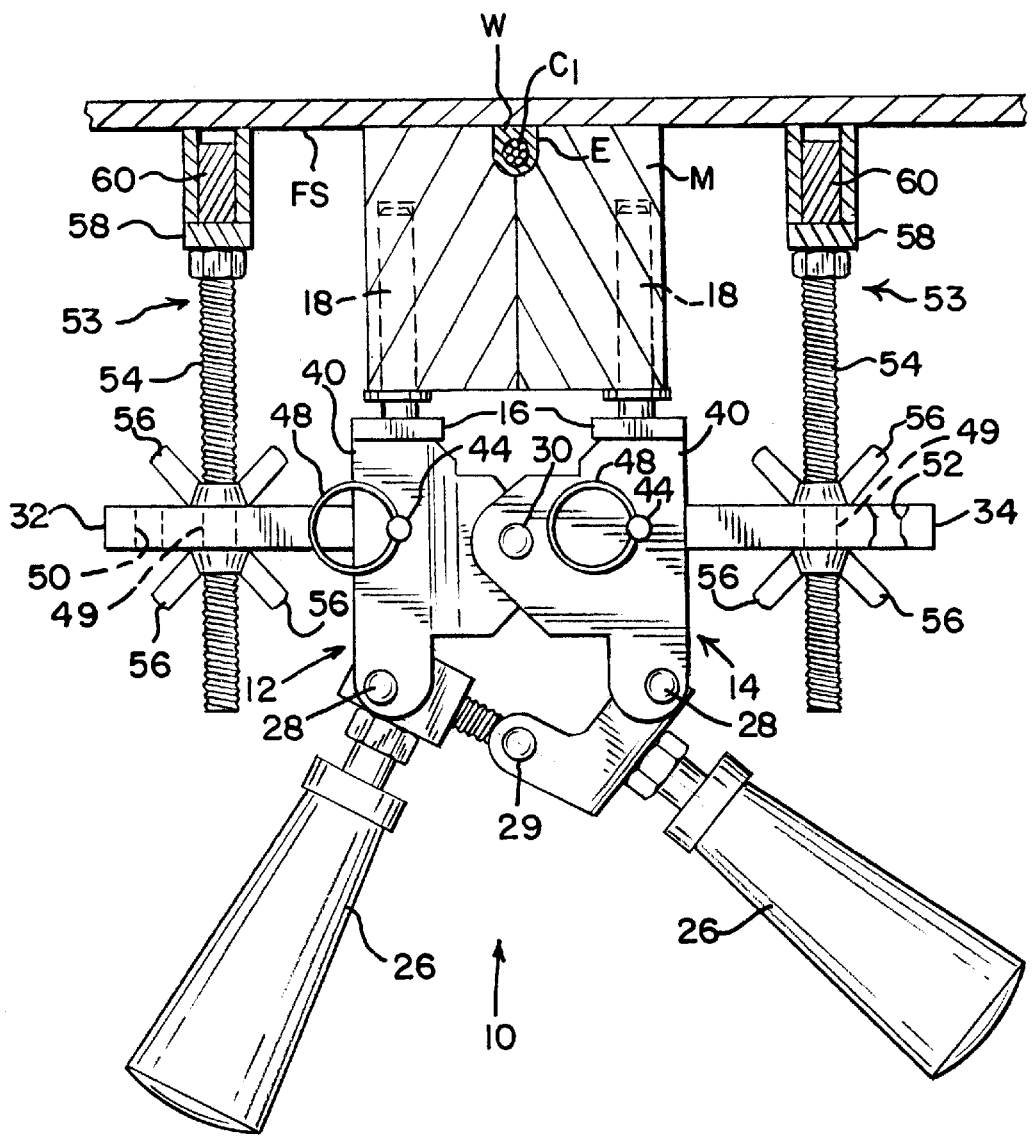
FIG. 5 is a cross-sectioned plan view, as viewed substantially along line 5—5 of FIG. 4, showing the cavity, weld metal and cable within the mold and the handle clamp and magnetic fasteners mounted to the flat plate.
Figure 7:
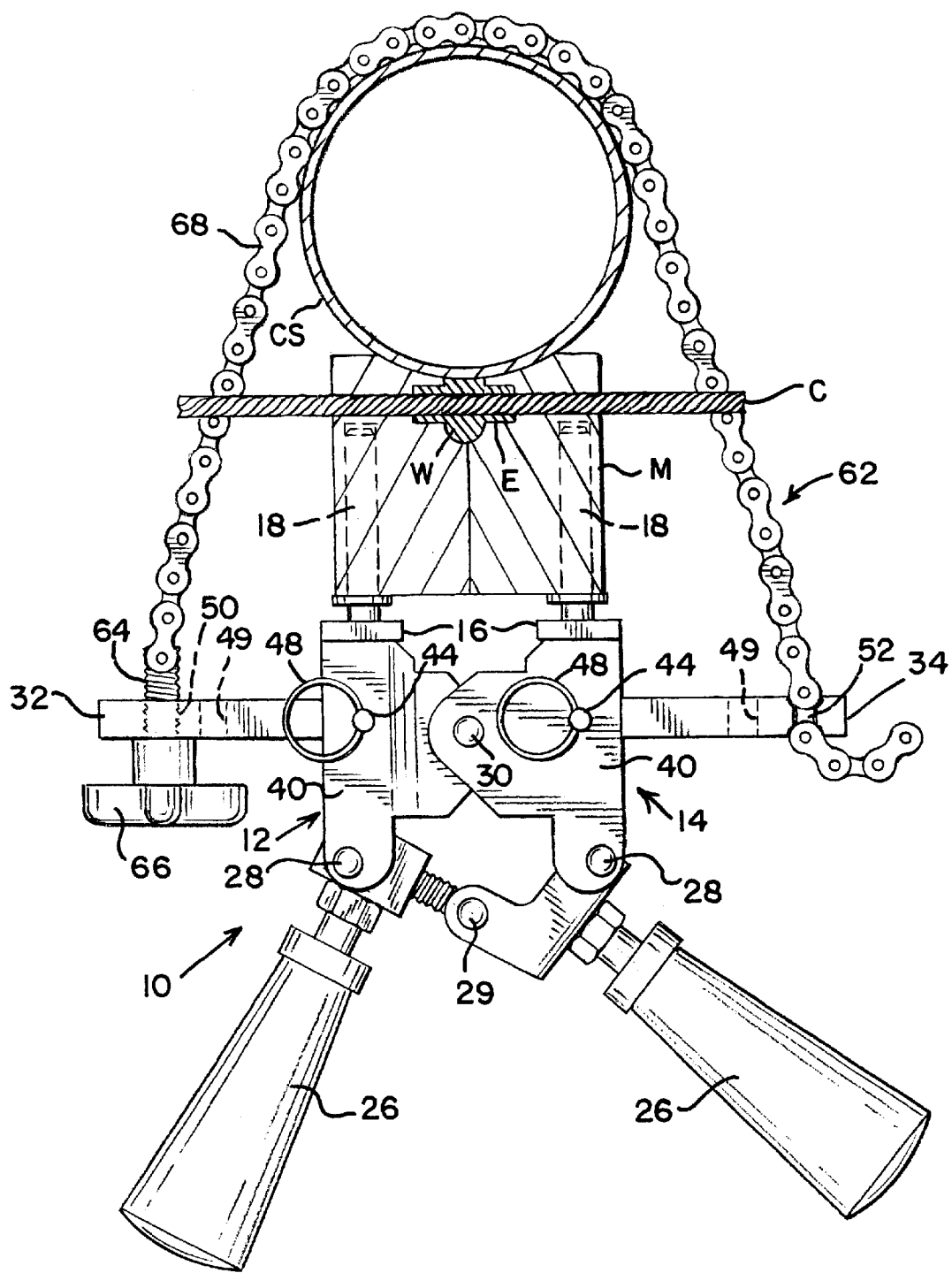
FIG. 7 is a cross-sectioned plan view, as viewed substantially along line 7—7 of FIG. 6, showing the cavity, weld metal and cable within the mold and the handle clamp, mold and chain fastener mounted to the rounded surface.

The end of support arm 32 opposite its step 36 is provided with a pair of spaced openings 49 and 50, as best seen in FIGS. 5 and 7. The other mold support arm 34 is also provided with an opening 49. However, instead of a second opening as in mold support arm 32, mold support arm 34 includes a notch 52 for holding a link chain. Thus, one set of support arms 32, 34 is capable of use with either magnetic or chain fastening assemblies as will be described to follow.

Figure 4:
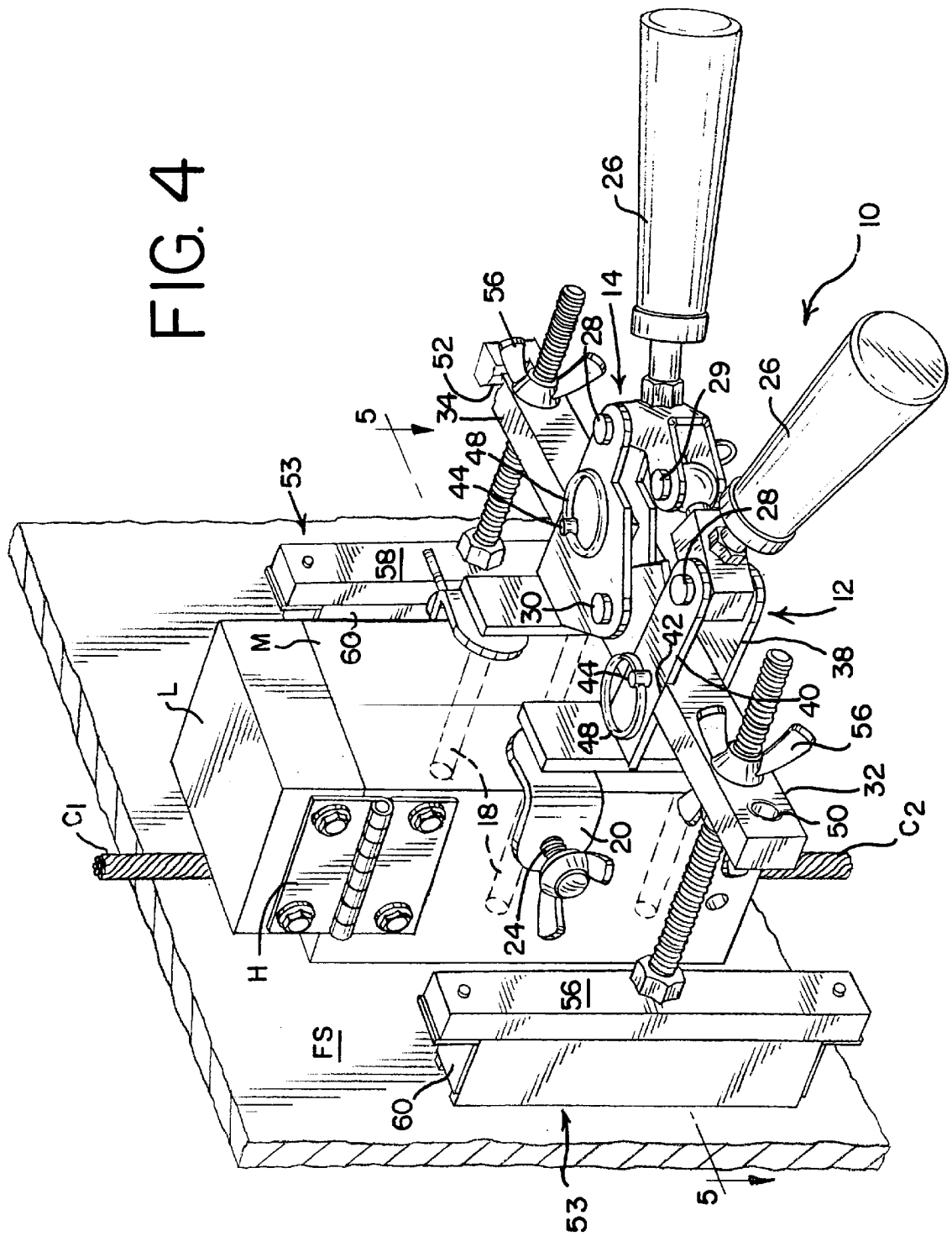
FIG. 4 is a partially broken perspective view of the preferred embodiment of handle clamp of the present invention and exothermic welding mold with the magnetic fasteners as seen in FIG. 1 mounting the mold to a flat plate for connecting a cable to the flat plate.

As shown in FIGS. 4 and 5, an exothermic welding assembly is shown for coupling one or more cables $C_1$ or $C_2$ to a flat surface FS. As best seen in FIG. 5, the enlarged cavity E of the mold M has an open face which faces the flat surface FS. The enlarged cavity E receives the cables $C_1$, and $C_2$ therein and positions them in close proximity to each other and the flat surface so that when the weld metal W is fired in the cavity E, it will also bond to the flat surface FS.

When it is desired to mount the mold M and handle clamp 10 to the flat surface FS, a magnetic fastening assembly 53 is mounted to each of the support arms 32 and 34. The magnetic fastening assembly 53 includes a threaded rod 54 which is inserted through the openings 49 in each of the mold support arms 32 and 34, and wing nuts 56 are preferably provided to longitudinally hold the rods in place.

A magnet support bar 58 with magnets 60 is fixed to the other end of each of the rods 54 so that the mold M with its enlarged cavity E and the handle clamp 10 may be magnetically mounted against the flat surface FS, which is typically the surface of a steel plate, during the exothermic welding procedure as shown in FIGS. 4 and 5.

Figure 6:
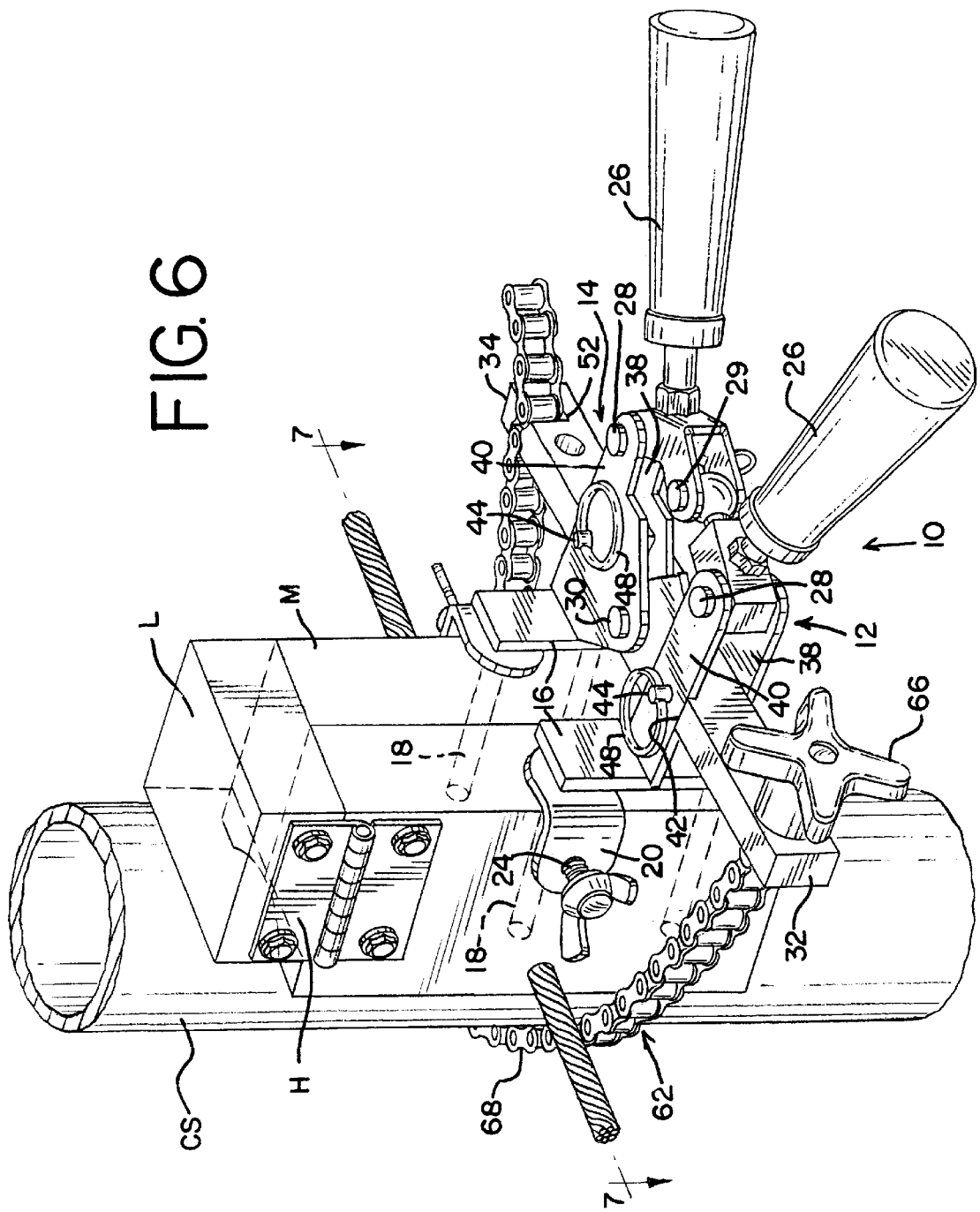
FIG. 6 is a perspective view of the preferred embodiment of handle clamp of the present invention and exothermic welding mold with the chain fastener as seen in FIG. 1 mounting the mold to a rounded surface for the connection of a cable to the rounded surface.

If instead the exothermic weld is to be made to the curved surface CS of a pipe as shown in FIGS. 6 and 7, the magnetic fastening assemblies 53 are removed from the mold support arms 32 and 34, and a chain fastening assembly 62 is attached as seen in FIGS. 1, 6 and 7. The chain assembly 62 also comprises a short rod 64 onto which a knob nut 66 is threaded. The rod 64 extends through the opening 50 on mold support arm 32, and a link chain 68 is attached at one end to the rod 64 and is fixed at the other end in notch 52 in the other support arm 34. Thus, the mold M with its mold cavity E and handle clamp 10 may be mounted to the curved surface CS of the pipe by wrapping the chain 62 about the pipe and taking a tension on the chain by turning the knob nut 66 as seen best in FIGS. 6 and 7.

From the foregoing, it will be seen that a single handle clamp 10 may be utilized in at least three different exothermic welding operations without the need to provide custom, specially designed handle clamps for each of the operations. The handle clamp 10 may be utilized with or without the support arms 32 and 34 to simply clamp the mold parts together where only the ends of cables are to be connected together within the cavity of the mold as shown in FIGS. 1–3. Where it is desired to connect the cables to either a flat surface or a curved surface, the support arms 32 and 34 are attached to the handle clamp 10 with the pins 44, and either the magnetic fastening assembly 53 as shown in FIGS. 1, 4 and 5 or the chain assembly 62 as shown in FIGS. 1, 6 and 7 is attached to the support arms 32 and 34 to fasten the handle clamp 10 and mold M to the respective differently shaped surfaces.

It will be understood that the preferred embodiment of the present invention which has been described is merely illustrative of the principles of the invention. Numerous modifications may be made by those skilled in the art without departing from the true spirit and scope of the invention.

I claim:

1. A handle clamp for exothermic welding molds comprising:

a pair of supports spaced from each other, but moveable toward and away from each other, each of said supports having clamping elements for mounting said supports to an exothermic welding mold and clamping the mold together;

a pair of links having opposite ends, each of said supports being mounted adjacent one end of each of said pair of links;

a pair of handles, each of said handles being mounted adjacent the other end of each of said links;

a pin assembly coupling said links and handles so that said links, supports and clamping elements move relative to each other when said handles are moved relative to each other; and a pair of support arms, one of said support arms extending from each of said links generally in the direction of said movement of said links relative to each other, each of said support arms having a first end which is removably attached to the link of said support arm.

2. The handle clamp of claim 1, wherein each of said links comprises a pair of flanges spaced from each other, and said first end of said support arms extends between the spaced flanges of each of said links.

3. The handle clamp of claim 2, wherein said first end of each of said support arms is stepped and the step is positioned between said flanges.

4. The handle clamp of claim 3, including a removable pin extending between said flanges and through said first end of each said support arm to removably fasten said support arm to said flanges.

5. The handle clamp of claim 1, wherein each of said support arms is constructed and arranged to mount a fastening adjacent an end thereof opposite said first end for fastening the mold to a structure when said support arms are attached to said links and said clamping element clamps the mold together.

6. The handle clamp of claim 5, wherein said fastening may include either a magnetic element or a chain.

7. The handle clamp of claim 1, wherein each of said support arms includes a hole and/or a notch to mount fastenings adjacent an end thereof opposite said first end for fastening the mold to a structure when said support arms are attached to the links and said clamping elements clamp the mold together.

8. The handle clamp of claim 7, wherein said fastening may include either magnetic elements or a chain.

9. The handle clamp of claim 1, wherein said clamping elements comprise at least one pin on each of said supports which is adapted to extend into the mold to be clamped.

10. A handle clamp for exothermic welding molds comprising:
    a pair of supports spaced from each other, but moveable toward and away from each other, each of said supports having clamping elements for mounting said supports to an exothermic welding mold and clamping the mold together;
    a pair of links having opposite ends, each of said supports being mounted adjacent one end of each of said pair of links;
    a pair of handles, each of said handles being mounted adjacent the other end of said pair of links;
    a pin assembly coupling said links and handles so that said links, supports and clamping elements move relative to each other when said handles are moved relative to each other; and
    a pair of support arms, one of said support arms attached to and extending from each of said links generally in the direction of said movement of said links relative to each other, said support arms being constructed and arranged to accommodate the mounting of either a magnetic or a chain fastening for fastening the mold to a structure.

11. The handle clamp of claim 10, wherein said clamping elements comprise at least one pin which is adapted to extend into the mold to be clamped.

12. A clamp kit for clamping or clamping and fastening a welding mold during exothermic welding, comprising:
    a handle clamp comprising a pair of links, a pin extending from one end of each of the links, said pins being adapted to enter openings in the mold to clamp the mold together, a handle adjacent the end of the links opposite said pins, and a pin assembly coupling said links and handles so that said links and pins move relative to each other when said handles are moved relative to each other;
    a pair of support arms each having a first end which is constructed and arranged to be removably attached to one of said links so that one of said support arms extends from said each of said links generally in the direction of said movement of said links relative to each other; and
    at least one fastener for mounting to said support arms adjacent the end of said support arms opposite said first end, said fastener comprising at least one of a magnetic element and/or a chain.

13. The clamp kit of claim 12, including a pin for removably attaching said support arms to said links.

14. The clamp kit of claim 12, wherein said kit includes only one pair of said support arms, a fastener having a magnetic element, and a fastener having a chain.

15. A clamp kit for clamping or clamping and fastening a welding mold during exothermic welding, comprising:
    a handle clamp comprising a pair of links, a pin extending from one end of each of the links, said pins being adapted to enter openings in the mold to clamp the mold together, a handle adjacent the end of the links opposite said pins, and a pin assembly coupling said links and handles so that said links and pins move relative to each other when said handles are moved relative to each other;
    a pair of support arms each having a first end which may be removably attached to one of said links so that one of said support arms extends from said each of said links generally in the direction of said movement of said links relative to each other; a pin for removably attaching said support arms to said links; and
    at least one fastener for mounting to said support arms adjacent the end of said support arms opposite said first end, said fastener comprising at least one of a magnetic element and/or a chain.

16. The clamp kit of claim 15, wherein said kit includes only one pair of said support arms, a fastener having a magnetic element, and a fastener having a chain.

\* \* \* \* \*

UNITED STATES PATENT AND TRADEMARK OFFICE
CERTIFICATE OF CORRECTION

PATENT NO.    : 6,382,496 B1
DATED         : May 7, 2002
INVENTOR(S)   : Timothy R. Harger It is certified that error appears in the above-identified patent and that said Letters Patent is hereby corrected as shown below:

<u>Column 5,</u>
Line 25, after "pipe" insert -- surface. --
Line 43, delete "surface."

Signed and Sealed this

Eleventh Day of May, 2004

JON W. DUDAS
*Acting Director of the United States Patent and Trademark Office*